United States Patent
Futaki et al.

(10) Patent No.: US 12,219,471 B2
(45) Date of Patent: Feb. 4, 2025

(54) RADIO ACCESS NETWORK NODE APPARATUS, AMF APPARATUS, AND METHODS THEREFOR

(71) Applicant: NEC Corporation, Tokyo (JP)

(72) Inventors: Hisashi Futaki, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 471 days.

(21) Appl. No.: 17/629,017

(22) PCT Filed: Jan. 15, 2021

(86) PCT No.: PCT/JP2021/001338
§ 371 (c)(1),
(2) Date: Jan. 21, 2022

(87) PCT Pub. No.: WO2021/199581
PCT Pub. Date: Oct. 7, 2021

(65) Prior Publication Data
US 2022/0286951 A1 Sep. 8, 2022

(30) Foreign Application Priority Data
Apr. 2, 2020 (JP) .................... 2020-067094

(51) Int. Cl.
*H04W 48/18* (2009.01)
*H04W 48/04* (2009.01)
(Continued)

(52) U.S. Cl.
CPC .......... *H04W 48/18* (2013.01); *H04W 48/04* (2013.01); *H04W 60/04* (2013.01); *H04W 76/15* (2018.02)

(58) Field of Classification Search
CPC ..... H04W 48/18; H04W 48/04; H04W 60/04; H04W 76/15; H04W 92/14; H04W 92/20
See application file for complete search history.

(56) References Cited

U.S. PATENT DOCUMENTS

2018/0324645 A1* 11/2018 Park ................. H04W 36/0016
2019/0246310 A1* 8/2019 Han ..................... H04W 28/04
(Continued)

FOREIGN PATENT DOCUMENTS

| CN | 111092705 A * 5/2020 ........... H04L 5/0098 |
| EP | 3493648 A1 6/2019 |

(Continued)

OTHER PUBLICATIONS

International Search Report for PCT Application No. PCT/JP2021/001338, mailed on Apr. 6, 2021.
(Continued)

*Primary Examiner* — Chi H Pham
*Assistant Examiner* — Vladislav Y Agureyev
(74) *Attorney, Agent, or Firm* — Sughrue Mion, PLLC

(57) ABSTRACT

A RAN node apparatus (1) sends to, an AMF (3) in a core network, slice support information indicating a network slice supported by another RAN node (2) that can be used as a secondary node in dual connectivity in which the RAN node apparatus (1) acts as a master node. This can contribute, for example, to allowing the AMF to determine a network slice allowed to a UE, while taking into account a network slice supported by a secondary node of dual connectivity.

9 Claims, 10 Drawing Sheets

(51) Int. Cl.
*H04W 60/04* (2009.01)
*H04W 76/15* (2018.01)

(56) References Cited

U.S. PATENT DOCUMENTS

| | | | |
|---|---|---|---|
| 2019/0335366 | A1 | 10/2019 | Jin et al. |
| 2019/0357131 | A1 | 11/2019 | Sivavakeesar et al. |
| 2020/0367109 | A1* | 11/2020 | Chen ............... H04W 28/18 |
| 2021/0037426 | A1* | 2/2021 | Zhu ................ H04W 76/12 |
| 2021/0105308 | A1* | 4/2021 | Bouazizi .......... H04L 65/1016 |
| 2022/0007184 | A1* | 1/2022 | Ferdi ............... H04L 63/0892 |
| 2022/0030429 | A1* | 1/2022 | Lei .................. H04L 63/0892 |
| 2022/0060883 | A1* | 2/2022 | Zhu ................. H04W 8/245 |
| 2022/0240213 | A1* | 7/2022 | Ly ................... H04W 60/04 |
| 2022/0264490 | A1* | 8/2022 | Sha ................. H04W 56/001 |
| 2022/0369363 | A1* | 11/2022 | Ferdi ............... B64C 39/024 |
| 2023/0052699 | A1* | 2/2023 | Ninglekhu ......... H04W 60/04 |

FOREIGN PATENT DOCUMENTS

| | | | | |
|---|---|---|---|---|
| EP | 4362577 | A2 * | 5/2024 | ............ H04W 16/02 |
| WO | 2019/057106 | A1 | 3/2019 | |

OTHER PUBLICATIONS

3GPP TS 23.501 V16.3.0 (Dec. 2019) "3rd Generation Partnership Project; Technical Specification Group Services and System Aspects; System Architecture for the 5G System (5GS); Stage 2 (Release 16)", Dec. 2019, pp. 1-417.

3GPP TS 23.502 V16.3.0 (Feb. 2019) "3rd Generation Partnership Project; Technical Specification Group Services and System Aspects; Procedures for the 5G System (5GS); Stage 2 (Release 16)", Dec. 2019, pp. 1-558.

S2-1908583, Nokia et al., "New WID Study on Enhancement of Network Slicing Phase 2", 3GPP TSG-SA WG2 Meeting #134, Sapporo, Japan, Jun. 24-28, 2019, pp. 1-3.

RP-193254, CMCC et al., "Study on enhancement of RAN Slicing", 3GPP TSG-RAN meeting #86, Sitges, Barcelona, Dec. 9-12, 2019, pp. 1-4.

S2-2001467, Samsung et al., "Key Issue on 5GC assisted cell selection to access network slice", 3GPP TSG-SA WG2 Meeting #136 Ad-hoc, Incheon, Korea, Jan. 13-17, 2020, pp. 1-4.

R3-173144, CMCC, "Slice Impact on Multi-Connectivity", 3GPP TSG-RAN WG3 Meeting #97, Aug. 21-25, 2017, pp. 1-3.

R3-171252, Huawei, "Dual Connectivity for Slicing", 3GPP TSG-RAN WG3 Meeting #95bis, Apr. 3-7, 2017, pp. 1-3.

Extended European Search Report for EP Application No. EP21782412.7 dated on Sep. 5, 2022.

"3rd Generation Partnership Project; Technical Specification Group Radio Access Network; Study on New Radio Access Technology; Radio Access Architecture and Interfaces (Release 14)", 3GPP TR 38.801 V2.0.0 (Mar. 2017).

"3rd Generation Partnership Project; Technical Specification Group Radio Access Network; NG-RAN; NG Application Protocol (NGAP) (Release 16)", 3GPP TS 38.413 V16.1.0 (Mar. 31, 2020).

"3rd Generation Partnership Project; Technical Specification Group Radio Access Network; NG-RAN; Xn application protocol (XnAP) (Release 16)", 3GPP TS 38.423 V16.1.0 (Mar. 31, 2020).

* cited by examiner

9.2.6.4 RAN CONFIGURATION UPDATE

| IE/Groupe Name | Presence | Range | IE type and reference | Semantics description |
|---|---|---|---|---|
| Message Type | M | | 9.3.1.1 | |
| RAN Node Name | O | | | |
| Supported TA List | | 0..1 | | Supported TAs in the NG-RAN node. |
| >Supported TA Item | | 1..\<maxnoofTACs\> | | |
| >>TAC | M | | 9.3.3.10 | Broadcast TAC |
| >>Broadcast PLMN List | | 1 | | |
| >>Broadcast PLMN Item | | 1..\<maxnoof BPLMNs\> | | |
| >>>PLMN Identity | M | | 9.3.3.5 | Broadcast PLMN |
| >>>TAI Slice Support List | M | | Slice Support List 9.3.1.17 | Supported S-NSSAIs per TA. |
| >Supported TA Item of Secondary RAT | | 0..\<maxnoofTACs\> | | |
| >>TAC of SecondaryRAT | O | | 9.3.3.10 | Broadcast TAC |
| >>Broadcast PLMN List | | 1 | | |
| >>Broadcast PLMN Item | | 1..\<maxnoof BPLMNs\> | | |
| >>>PLMN Identity | M | | 9.3.3.5 | Broadcast PLMN |
| >>>TAI Slice Support List | M | | Slice Support List 9.3.1.17 | Supported S-NSSAIs per TA. |
| ... | | | | |

Fig. 5

9.2.5.1 INITIAL UE MESSAGE

| IE/Groupe Name | Presence | Range | IE type and reference | Semantics description |
|---|---|---|---|---|
| Message Type | M | | 9.3.1.1 | |
| RAN UE NGAP ID | M | | 9.3.3.2 | |
| NAS-PDU | M | | 9.3.3.4 | |
| User Location Information | M | | 9.3.1.16 | |
| RRC Establishment Cause | M | | 9.3.1.111 | |
| 5G-S-TMSI | O | | 9.3.3.20 | |
| AMF Set ID | O | | 9.3.3.12 | |
| UE Context Request | O | | ENUMERATED (requested, ...) | |
| Allowed NSSAI | O | | 9.3.1.31 | |
| Requested S-NSSAI List for Secondary RAT | O | | | |
| >Requested S-NSSAI Item | | | | |
| >>S-NSSAI | M | | | |
| Source to Target AMF Information Reroute | O | | 9.3.3.27 | |

Fig. 7

9.2.5.1 INITIAL UE MESSAGE

| IE/Groupe Name | Presence | Range | IE type and reference | Semantics description |
|---|---|---|---|---|
| Message Type | M | | 9.3.1.1 | |
| RAN UE NGAP ID | M | | 9.3.3.2 | |
| NAS-PDU | M | | 9.3.3.4 | |
| User Location Information | M | | 9.3.1.16 | |
| RRC Establishment Cause | M | | 9.3.1.111 | |
| 5G-S-TMSI | O | | 9.3.3.20 | |
| AMF Set ID | O | | 9.3.3.12 | |
| UE Context Request | O | | ENUMERATED (requested, ...) | |
| Allowed NSSAI | O | | 9.3.1.31 | |
| Requested S-NSSAI List | O | | | |
| >Requested S-NSSAI Item | M | | | |
| >>S-NSSAI | M | | | |
| >>>Secondary RAT Support | M | | ENUMERATED(Support, Not Supported, ...) | |
| Source to Target AMF Information Reroute | O | | 9.3.3.27 | |

Fig. 8

RADIO ACCESS NETWORK NODE APPARATUS, AMF APPARATUS, AND METHODS THEREFOR

This application is a National Stage Entry of PCT/JP2021/001338 filed on Jan. 15, 2021, which claims priority from Japanese Patent Application 2020-067094 filed on Apr. 2, 2020, the contents of all of which are incorporated herein by reference, in their entirety.

TECHNICAL FIELD

The present disclosure relates to a radio communication network, especially network slicing.

BACKGROUND ART

The 5G system (5GS) supports network slicing (see, for example, Non-Patent Literature 1 and 2, especially Section 5.15 of Non-Patent Literature 1). Network slicing use Network Function Virtualization (NFV) and software-defined networking (SDN) technologies, thereby creating multiple virtualized logical networks on top of physical networks. Each virtualized logical network is called a network slice. A network slices provides specific network capabilities and network characteristics. A network slice instance (NSI) is defined as a set of network function (NF) instances and resources (e.g., computer processing resources, storage, and networking resources) in a core network (CN) for creating a single network slice. In addition, an NSI may be defined as a set of NF instances and resources in the CN and an access network (AN) (one or both of a Next Generation Radio Access Network (NG-RAN) and a Non-3GPP Interworking Function (N3IWF)).

A network slice is identified by an identifier known as Single Network Slice Selection Assistance Information (S-NSSAI). The S-NSSAI consists of a Slice/Service type (SST) and a Slice Differentiator (SD). The SST refers to the expected network slice behavior in terms of features and services. The SD is optional information and complements the SST to differentiate amongst multiple network slices of the same Slice/Service type.

An S-NSSAI can have standard values or non-standard values. Currently, standard SST values 1, 2, 3, and 4 are associated respectively with enhanced Mobile Broad Band (eMBB), Ultra Reliable and Low Latency Communication (URLLC), Massive Internet of Things (MIoT), and Vehicle to Everything (V2X) slice types. Anon-standard value of an S-NSSAI with identifies a single network slice within a specific Public Land Mobile Network (PLMN). In other words, non-standard values are PLMN-specific values, and associated with the PLMN ID of a PLMN that has assigned them. Each S-NSSAI ensures assists a network in selecting a particular NSI. A NSI may be selected via different S-NSSAIs. An S-NSSAI may be associated with different NSIs. A network slice may be uniquely identified by an S-NSSAI.

Meanwhile, Network Slice Selection Assistance Information (NSSAI) means a set of S-NSSAIs. Accordingly, one or more S-NSSAIs can be included in one NSSAI. There are multiple types of NSSAI, known as Configured NSSAI, Requested NSSAI, Allowed NSSAI, Rejected NSSAI, and Pending NSSAI.

A Configured NSSAI includes one or more S-NNSAIs each applicable to one or more PLMNs. For example, The Configured NSSAI is configured by a Serving PLMN and is applied to the Serving PLMN. Alternatively, the Configured NSSAI may be a Default Configured NSSAI. The Default Configured NSSAI is configured by the Home PLMN (HPLMN) and applies to any PLMNs for which no specific Configured NSSAI has been provided. For example, a radio terminal (User Equipment (UE)) is provisioned with the Default Configured NSSAI from a Unified Data Management (UDM) of the HPLMN via an Access and Mobility Management Function (AMF).

A Requested NSSAI is signaled by a UE to a network in, for example, a registration procedure, allowing the network to determine a serving AMF, at least one network slice and at least one NSIs, for this UE.

An allowed NSSAI is provided to a UE by a Serving PLMN and indicates one or more S-NSSAIs that the UE can use in the current Registration Area of the Serving PLMN. The Allowed NSSAI is determined by an AMF of the Serving PLMN, for example, during a registration procedure. Accordingly, the Allowed NSSAI is signaled to the UE by the network (i.e., AMF) and stored in memories (e.g., non-volatile memories) of both the AMF and the UE.

A Rejected NSSAI includes one or more S-NSSAIs rejected by the current PLMN. The Rejected NSSAI may be referred to as rejected S-NSSAIs. A S-NSSAI is rejected throughout the current PLMN or rejected in the current registration area. If an AMF rejects any of one or more S-NSSAIs included in the Requested NSSAI, for example, in a registration procedure of a UE, it includes them in the Rejected NSSAI. The Rejected NSSAI is signaled to the UE by the network (i.e., AMF) and stored in memories of both the AMF and the UE.

A Pending NSSAI indicates one or more S-NSSAIs for which Network Slice-Specific Authentication and Authorization (NSSAA)) is pending. A Serving PLMN shall perform NSSAA for S-NSSAIs of the HPLMN which are subject to NSSAA based on subscription information. In order to perform NSSAA, an AMF invokes an Extensible Authentication Protocol (EAP)-based authorization procedure. The EAP-based authentication procedure takes a relatively long time to obtain its outcome. Accordingly, whilst the AMF determines an Allowed NSSAI as described above during a registration procedure of a UE, it does not include S-NSSAIs subject to NSSAA in the Allowed NSSAI, but instead them in the Pending NSSAI. The Pending NSSAI is signaled to the UE by the network (i.e., AMF) and stored in memories of both the AMF and the UE.

The 3rd Generation Partnership Project (3GPP) will discussions on Release 17 in the first quarter of 2020. Enhancements to network slices will be discussed for Release 17 (see, for example, Non-Patent Literature 3, 4, and 5). Non-Patent Literature 3 proposes that a study is needed to support parameters contained in the Generic Slice Template (GST), proposed by the GSM Association, in the 5GS. Non-Patent Literature 4 proposes that it is necessary to study a mechanism for enabling a User Equipment (UE) to quickly access a cell that supports an intended slice. Non-Patent Literature 5 points out an issue that according to the current 3GPP specification, a UE needs to select an NG-RAN node to perform a registration procedure without knowing which NG-RAN node supports which network slice. Non-Patent Literature 5 proposes that it is necessary to consider how to select a particular cell that can be used to access the intended network slice.

CITATION LIST

Non Patent Literature

[Non-Patent Literature 1] 3GPP TS 23.501 V16.3.0 (2019 December) "3rd Generation Partnership Project; Technical Specification Group Services and System Aspects; System Architecture for the 5G System (5GS); Stage 2 (Release 16)", December 2019

[Non-Patent Literature 2] 3GPP TS 23.502 V16.3.0 (2019 December) "3rd Generation Partnership Project; Technical Specification Group Services and System Aspects; Procedures for the 5G System (5GS); Stage 2 (Release 16)", December 2019

[Non-Patent Literature 3] Nokia, Nokia Shanghai Bell, ZTE, Sanechips, Telecom Italia, Sprint, NEC, KDDI; Deutsche Telekom, InterDigital, Orange, Vodafone, Verizon UK Ltd, UIC, ETRI, Broadcom, Lenovo, Cisco, Telefonica S.A., Huawei, China Mobile, CATT, "New WID Study on Enhancement of Network Slicing Phase 2", S2-1908583, 3GPP TSG-SA WG2 Meeting #134, Sapporo, Japan, 24-28 Jun. 2019

[Non-Patent Literature 4] CMCC, Verizon, "Study on enhancement of RAN Slicing", RP-193254, 3GPP TSG-RAN meeting #86, Sitges, Barcelona, 9-12 Dec. 2019

[Non-Patent Literature 5] Samsung, AT&T, Sprint, InterDigital, China Mobile, SK Telecom, Convida Wireless, ZTE, Apple, KDDI, "Key Issue on 5GC assisted cell selection to access network slice", S2-2001467, 3GPP TSG-SA WG2 Meeting #136 Ad-hoc, Incheon, Korea, 13-17 Jan. 2020

SUMMARY OF INVENTION

Technical Problem

The inventors have studied network slicing and found various issues. One of them concerns a case where a Master Node (MN) of Dual Connectivity (DC) does not support a network slice that the UE intends to use, while a Secondary Node (SN) support it.

According to the current 3GPP specifications, an NG-RAN node that is able to function as an MN in DC (hereinafter referred to as a potential or candidate MN) notifies an Access and Mobility management Function (AMF) in a 5G Core Network (5GC) of network slices supported by the potential MN. More specifically, the potential MN provides the AMF with a Supported TA List Information Element (IE) and a TAI Slice Support List IE, during a procedure for setting up application-level configuration data required to interwork with the AMF on a control plane interface (i.e., N2 (or NG-C) interface). The Supported TA List IE indicates the Tracking Areas (TAs) supported in the potential MN. The TAI Slice Support List IE is contained in the Supported TA List IE and indicates supported S-NSSAIs per TA (or per Tracking Area Identity (TAI)). A Single Network Slice Selection Assistance Information (S-NSSAI) is an identifier of a network slice.

Furthermore, according to the current 3GPP specifications, the potential MN exchanges information on supported network slices, during a procedure for setting up a control plane (CP) interface (i.e., Xn-C interface) with an NG-RAN node that is able to function as an SN in DC (hereinafter referred to as a potential or candidate SN). More specifically, the potential MN receives a TAI Support List IE and a TAI Slice Support List IE from the potential SN. The TAI Support List IE indicates the TAs supported in the potential SN. The TAI Slice Support List IE is contained in the TAI Support List IE and indicates supported S-NSSAIs per TA (or per TAI).

However, if the potential SN is responsible for only an SN in DC, the potential SN has no CP interface with the AMF, and accordingly does not share information about the network slices it supports with the AMF. If a UE selects the potential MN for a registration procedure to the 5GC and requests a network slice (e.g., S-NSSAI #2) that is not supported by the potential MN but is supported by the potential SN, the AMF does not allow S-NSSAI #2 to the UE because the AMF knows that the potential MN does not support S-NSSAI #2. If S-NSSAI #2 is only available in a specific frequency band (e.g., 28 GHz) and that specific frequency band is deployed only under an SN in DC, then the UE may not be able to use services provided via NSSAI #2.

One of the objects to be attained by embodiments disclosed herein is to provide apparatuses, methods, and programs that contribute to allowing an AMF to determine a network slice allowed to a UE, while taking into account a network slice supported by a secondary node of dual connectivity. It should be noted that this object is merely one of the objects to be attained by the embodiments disclosed herein. Other objects or problems and novel features will be made apparent from the following description and the accompanying drawings.

Solution to Problem

In a first aspect, a RAN node apparatus includes at least one memory and at least one processor coupled to the at least one memory. The at least one processor is configured to send to an AMF in a core network, slice support information indicating a network slice supported by another RAN node that can be used as a secondary node in dual connectivity in which the RAN node apparatus acts as a master node.

In a second aspect, an AMF apparatus includes at least one memory and at least one processor coupled to the at least one memory. The at least one processor is configured to receive, from a first radio access network (RAN) node, slice support information indicating a network slice supported by a second RAN node that can be used as a secondary node in dual connectivity in which the first RAN node acts as a master node.

In a third aspect, a method performed by a RAN node apparatus includes sending, to an AMF in a core network, slice support information indicating a network slice supported by another RAN node that can be used as a secondary node in dual connectivity in which the RAN node apparatus acts as a master node.

In a fourth aspect, a method performed by an AMF apparatus includes receiving, from a first radio access network (RAN) node, slice support information indicating a network slice supported by a second RAN node that can be used as a secondary node in dual connectivity in which the first RAN node acts as a master node.

In a fifth aspect, a program includes instructions (software codes) that, when loaded into a computer, cause the computer to perform the method according to the above-described third or fourth aspect.

Advantageous Effects of Invention

According to the above-described aspects, it is possible to provide apparatuses, methods, and programs that contribute to allowing an AMF to determine a network slice allowed to a UE, while taking into account a network slice supported by a secondary node of dual connectivity.

BRIEF DESCRIPTION OF DRAWINGS

FIG. 5 is a diagram showing an example of a format of a RAN CONFIGURATION UPDATE message;

FIG. 7 is a diagram showing an example of a format of an INITIAL UE MESSAGE message;

FIG. 8 is a diagram showing an example of a format of an INITIAL UE MESSAGE message;

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the 3rd Generation Partnership Project (3GPP) fifth generation mobile communication system (5G system (5GS)). Further, these embodiments will be described mainly for DC performed by a radio terminal (UE) and RAN nodes (NG-RAN) connected to the 5GC. Such a DC is called Multi-Radio Dual Connectivity (MR-DC). However, these embodiments may be applied to other radio communication systems that support network slicing and dual connectivity similar to those of the 5GS.

First Embodiment

Figure 1:
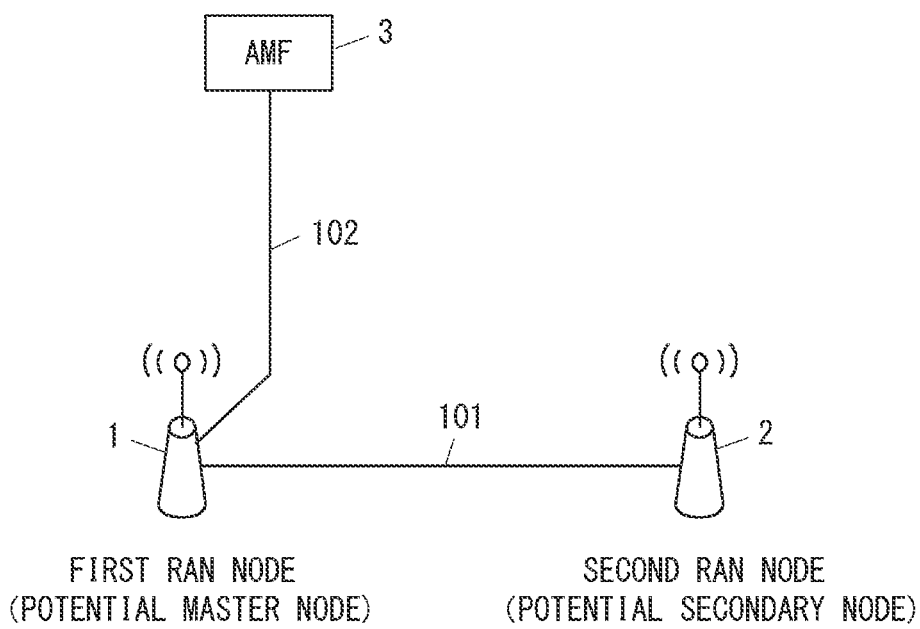
FIG. 1 is a diagram showing a configuration example of a radio communication network according to an embodiment.

FIG. 1 shows a configuration example of a radio communication network (i.e., 5GS) according to embodiments including this embodiment. In the examples of FIG. 1, the radio communication network includes Radio Access Network (RAN) nodes 1 and 2 and an AMF 3. Each element (or network function) shown in FIG. 1 may be implemented, for example, as a network element on dedicated hardware, as a software instance running on dedicated hardware, or as a virtualization function instantiated on an application platform.

The RAN nodes 1 and 2 are arranged in RAN (i.e., NG-RAN). The RAN nodes 1 and 2 may be gNBs. The RAN nodes 1 and 2 may be Central Units (e.g., gNB-CUs) in cloud RAN (C-RAN) deployment.

In the example of FIG. 1, the first RAN node 1 and the second RAN node 2 can operate as a master node (MN) and a secondary node (SN) of dual connectivity (DC), respectively. In the following, the first RAN node 1 may be referred to as a potential (or candidate) MN, and the second RAN node 2 may be referred to as a potential SN.

The first RAN node (potential MN) 1 and the second RAN node (potential SN) 2 are able to exchange signaling messages on a control plane (CP) interface 101 (i.e., Xn-C interface). Further, the first RAN node (potential MN) 1 terminates a RAN-CN CP interface 102 (i.e., N2 (or NG-C) interface) and interworks with the AMF 3 on the interface 102. On the other hand, the second RAN node (potential SN) 2 is responsible only for an SN in DC in the non-standalone deployment and does not have to have a RAN-CN CP interface (i.e., N2 (or NG-C) interface) with any AMF.

The AMF 3 is one of the network functions in the 5GC control plane. The AMF 3 provides the termination the RAN-CN CP interface 102 (i.e., N2 (or NG-C) interface). The AMF 3 terminates a single signaling connection (i.e., N1 NAS signalling connection) with a UE, and provides registration management, connection management, and mobility management. In addition, the AMF 3 provides NF services on a service-based interface (i.e., Namf interface) to NF consumers (e.g., other AMFs, Session Management Function (SMF), and Authentication Server Function (AUSF)). Furthermore, the AMF 3 uses NF services provided by other NFs (e.g., UDM, Network Slice Selection Function (NSSF), and Policy Control Function (PCF)).

Figure 2:
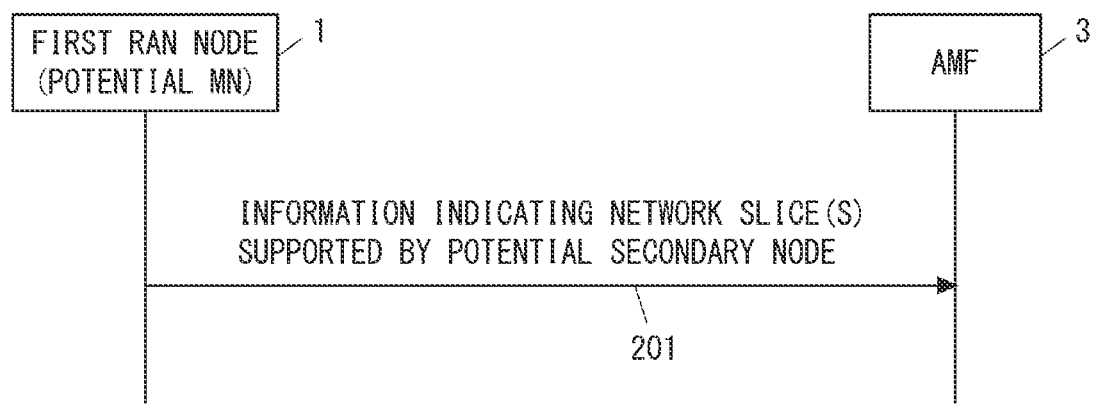
FIG. 2 is a sequence diagram showing an example of signaling according to an embodiment.

FIG. 2 shows an example of signaling between the first RAN node (potential MN) 1 and the AMF 3 according to the present embodiment. In step 201, the first RAN node (potential MN) 1 sends slice support information indicating a network slice supported by the second RAN node (potential SN) 2 to the AMF 3. In other words, the first RAN node 1 sends, to the AMF 3, slice support information indicating a network slice supported by the second RAN node 2 that can be used as an SN in DC where the first RAN node 1 acts as the MN. The Slice support information may include, for example, a list of one or more network slices.

The slice support information may indicate slice identifiers (i.e., S-NSSAIs) of one or more network slices supported by the second RAN node (potential SN) 2. More specifically, the slice support information may be associated with Tracking Areas (TAs) supported within the second RAN node (potential SN) 2, and may include a list of supported S-NSSAIs per TA supported by the second RAN node (potential SN) 2. One or more network slices supported by the second RAN node (potential SN) 2 may be preconfigured into the second RAN node (potential SN) 2, or may be configured (or changed as appropriate) by an Operation and Maintenance (O&M) apparatus.

In some implementations, the first RAN node 1 may send the slice support information indicating network slices supported by the second RAN node 2 to the AMF 3, via a non-UE associated signaling message. More specifically, the first RAN node 1 may send the slice support information to the AMF 3 via an NG SETUP REQUEST message or a RAN CONFIGURATION UPDATE message. The NG SETUP REQUEST message is sent in an NG Setup procedure. The NG Setup procedure is performed to set up application-level configuration data required for the first RAN node 1 and the AMF 3 to interwork on the RAN-CN CP interface 102 (i.e., N2 (or NG-C) interface). The RAN CONFIGURATION UPDATE message is sent in a RAN Configuration Update procedure. The RAN Configuration Update procedure is performed to update the application-level configuration data required for the first RAN node 1 and the AMF 3 to interwork on the RAN-CN CP interface 102 (i.e., N2 (or NG-C) interface).

Alternatively, the first RAN node 1 may send the slice support information, which indicates a network slice supported by the second RAN node 2, to the AMF 3 via a UE-associated signaling message. More specifically, in response to receiving an Access Stratum (AS) message containing a Non-Access Stratum (NAS) message and a Requested NSSAI from a UE, the first RAN node 1 may send the slice support information, which indicates a network slice supported by the second RAN node 2, to the AMF 3 via an N2 (NG-C) signaling message for forwarding the NAS message to the AMF 3. The AS message may be an RRC Setup Complete message. The N2 signaling message may be an INITIAL UE MESSAGE message.

In other words, in response to receiving an RRC setup complete message including a NAS message (registration request message) from a UE, the first RAN node 1 may send the slice support information (indicating a network slice supported by the second RAN node 2) to the AMF 3, via an INITIAL UE MESSAGE message for forwarding the NAS message (registration request message) to the AMF 3. The NAS message (registration request message) is sent in a registration procedure. The registration procedure of the 5GS is used, for example, for initial registration, periodic registration, and mobility registration. The initial registration is used by a UE to connect to the network after power-on. The periodic registration is used by a UE in the Connection Management (CM)-IDLE state to inform the network that the UE still exists. The mobility registration is used by a UE when the UE moves out of its registration area or when the UE needs to update its capabilities or other parameters that have been negotiated in the registration procedure.

In some implementations, the first RAN node 1 may receive from the second RAN node 2 an Xn-C message indicating a network slice(s) supported by the second RAN node 2. The first RAN node 1 may receive information on a network slice(s) supported by the second RAN node 2 via an XN SETUP REQUEST message or an XN SETUP RESPONSE message in a setup procedure of the Xn-C interface. More specifically, the first RAN node 1 may receive a TAI Support List IE and a TAI Slice Support List IE from the second RAN node 2. The TAI Support List IE indicates TAs supported in the second RAN node 2. The TAI Slice Support List IE is contained in the TAI Support List IE and indicates supported S-NSSAIs per TA (or TAI).

The procedure of FIG. 2 allows the potential MN 1 to inform the AMF 3 of a network slice(s) supported by the potential SN 2 that can be used for dual connectivity. The AMF 3 can know the network slice(s) supported by the potential SN 2, which the potential MN 1 can use for dual connectivity. Thus, for example, as shown in FIG. 3, the AMF 3 can determine network slices allowed for a UE (e.g., Allowed NSSAI, or list of allowed S-NSSAIs), while considering the network slice(s) supported by the potential SN 2 for dual connectivity.

Figure 3:
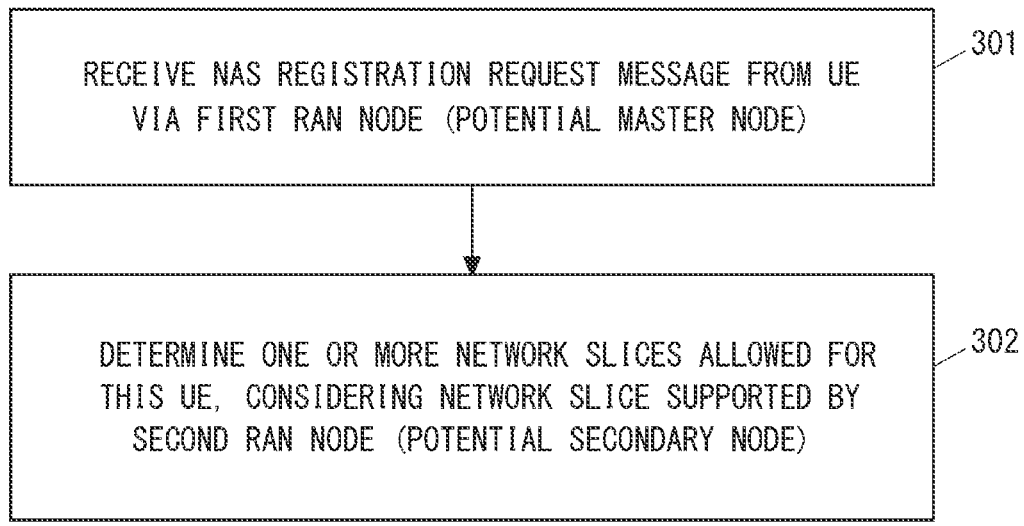
FIG. 3 is a flowchart showing an example of operation of an AMF according to an embodiment.

FIG. 3 shows an example of the operation of the AMF 3. In step 301, the AMF 3 receives a NAS message (registration request message) from a UE via the first RAN node (potential MN) 1. In step 302, the AMF 3 determines one or more network slices allowed for the UE, considering the network slice(s) supported by the second RAN node (potential SN) 2. Specifically, if an S-NSSAI included in a Requested NSSAI received from the UE via the NAS message (registration request message) is the same as or corresponds to one of the S-NSSAIs of the network slices supported by the second RAN node (potential SN), then the AMF 3 may generate and send an Allowed NSSAI containing this S-NSSAI to the UE.

According to the procedure of FIG. 3, the AMF 3 can allow the UE an S-NSSAI(s) that is not supported by the cell (i.e., potential Master Cell Group (MCG) cell) of the first RAN node (i.e., potential MN) 1 in which the UE executed the registration procedure but is supported only by a cell (i.e., potential Secondary Cell Group (SCG) cell) of the second RAN node (i.e., potential SN) 2. This enables the UE to utilize a service through an intended network slice, in a case where the second RAN node (potential SN) 2 is responsible only for an SN in DC in the non-standalone deployment and has no RAN-CN CP interface (i.e., N2 (or NG-C) interface) with any AMF.

As can be understood from the above description, the operations of the RAN node 1 and the AMF 3 shown in FIGS. 2 and 3 is especially effective when the second RAN node (potential SN) 2 is responsible for only an SN for DC in the non-standalone deployment and has no RAN-CN CP interface (i.e., N2 (or NG-C) interface) with any AMF. That is, these operations can allow the UE to utilize a network slice that is only supported by a SN in the non-standalone deployment.

Second Embodiment

A configuration example of a radio communication network according to present embodiment is the same as the example shown in FIG. 1. This embodiment provides a specific procedure that can be used by the first RAN node (potential MN) 1 to notify the AMF 3 of one or more network slices supported by the second RAN node (potential SN) 2.

Figure 4:
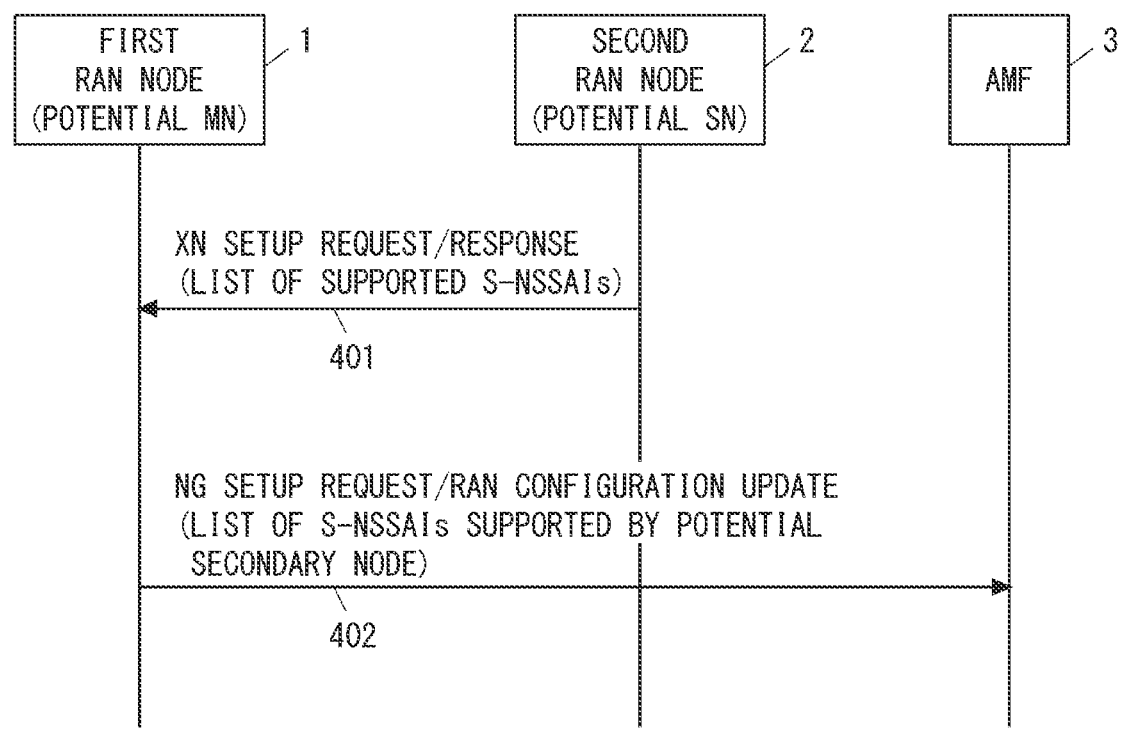
FIG. 4 is a sequence diagram showing an example of signaling according to an embodiment.

FIG. 4 shows an example of signaling according to present embodiment. In step 401, the first RAN node 1 receives slice support information indicating a network slice(s) supported by the second RAN node 2 from the second RAN node 2 via an XN SETUP REQUEST message or an XN SETUP RESPONSE message. More specifically, if the first RAN node 1 initiates an Xn Setup procedure, the first RAN node may receive the slice support information via an XN SETUP RESPONSE message. Instead, if the second RAN node 2 initiates an Xn Setup procedure, the first RAN node may receive the slice support information via an XN SETUP REQUEST message.

As already explained, the slice support information may be a list of S-NSSAIs supported by the second RAN node 2. More specifically, the first RAN node 1 may receive a TAI Support List IE and a TAI Slice Support List IE from the second RAN node 2. The TAI Support List IE indicates the TAs supported in the second RAN node 2. The TAI Slice Support List IE is contained in the TAI Support List IE and indicates the supported S-NSSAIs per TA (or TAI).

In step 402, the first RAN node 1 sends slice support information indicating a network slice(s) supported by the second RAN node (potential SN) 2 to the AMF 3 via an NG SETUP REQUEST message or a RAN CONFIGURATION UPDATE message. More specifically, if an NG Setup procedure has not yet been executed between the first RAN node 1 and the AMF 3, the first RAN node 1 may send the slice support information via an NG SETUP REQUEST message. Instead, if the NG Setup procedure between the first RAN node 1 and the AMF 3 has been successfully completed, the first RAN node 1 may send the slice support information via a RAN CONFIGURATION UPDATE message. The first RAN node 1 may send an N2 (NG-C) message containing the slice support information indicating a network slice(s) supported by the second RAN node (potential SN) 2 to the AMF 3 (step 402), in response to receiving an Xn-C message (step 401) containing the slice support information indicating a network slice(s) supported by second RAN node 2.

As described above, the slice support information may indicate slice identifiers (i.e., S-NSSAIs) of one or more network slices supported by the second RAN node (potential SN) 2. The slice support information may be associated with Tracking Areas (TAs) supported within the second RAN node (potential SN) 2, and may include a list of supported S-NSSAIs per TA supported by the second RAN node (potential SN) 2.

FIG. 5 shows a specific example of the format of the RAN CONFIGURATION UPDATE message sent in step 402. In the example of FIG. 5, a Supported TA List includes a Supported TA Item of Secondary RAT. The Supported TA Item of Secondary RAT includes a TAI Slice Support List. The TAI Slice Support List contains a list of S-NSSAIs that the Secondary RAT (i.e., the second RAN node (potential SN) 2) supports for this TA. The NG SETUP REQUEST message may include a Supported TA Item of Secondary RAT similar to that shown in FIG. 5.

The procedure of FIG. 4 enables the first RAN node 1 to send the slice support information indicating a network slice(s) supported by the second RAN node 2 to the AMF 3 via a non-UE-associated signaling message. In one example, in response to receiving a NAS message (registration request message) from a UE via the first RAN node (potential MN) 1, the AMF 3 may determine a network slice(s) allowed for the UE (e.g., Allowed NSSAI, or list of allowed S-NSSAIs) while considering the network slice(s) supported by the potential SN 2 for dual connectivity. Specifically, if an S-NSSAI included in a Requested NSSAI received from the UE via the NAS message (registration request message) is the same as or corresponds to one of the S-NSSAIs of the network slices supported by the second RAN node (potential SN) 2, then the AMF 3 may incorporate this S-NSSAI into an Allowed NSSAI of the UE.

Third Embodiment

A configuration example of a radio communication network according to present embodiment is the same as the example shown in FIG. 1. This embodiment provides another specific procedure that can be used by the first RAN node (potential MN) 1 to notify the AMF 3 of one or more network slices supported by the second RAN node (potential SN) 2.

Figure 6:
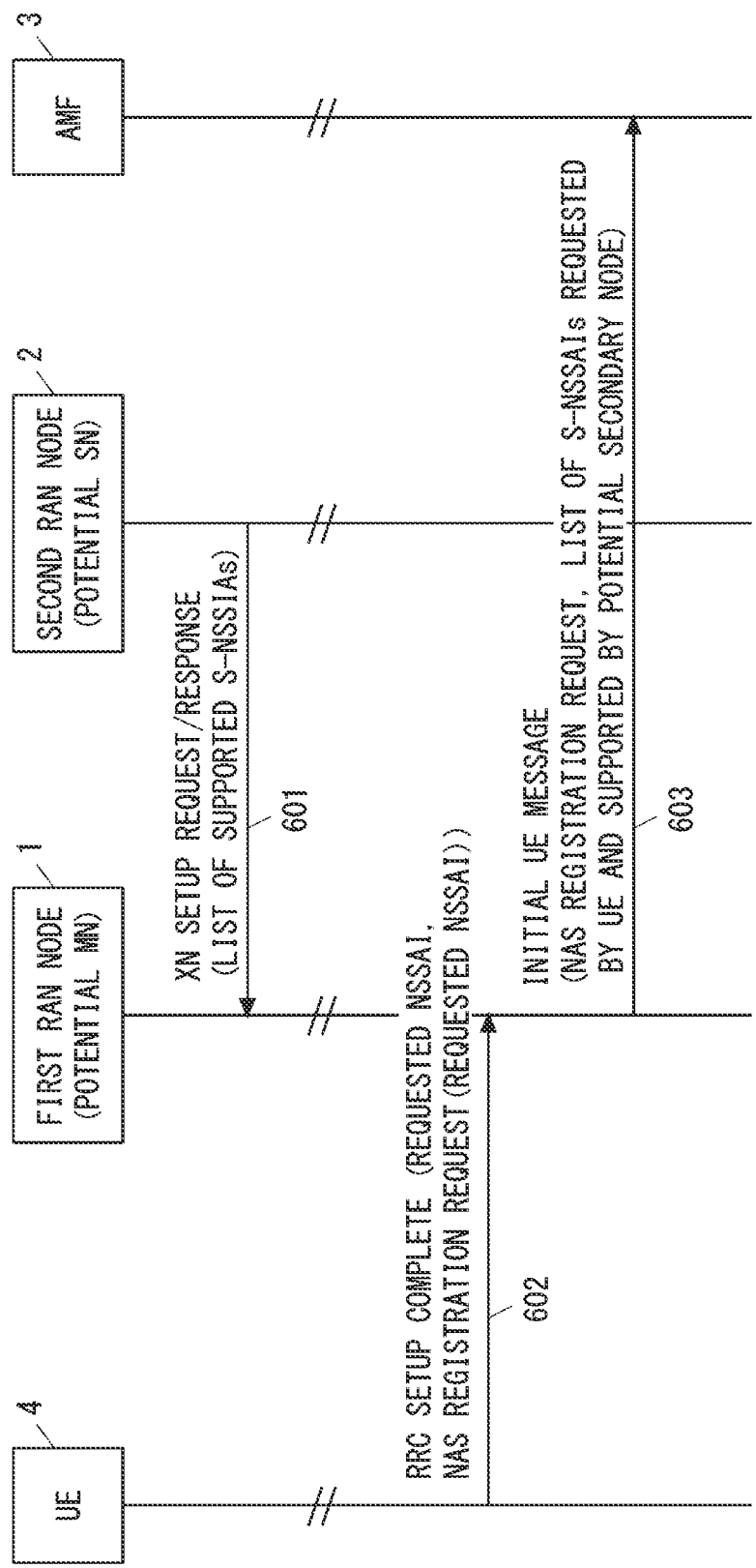
FIG. 6 is a sequence diagram showing an example of signaling according to an embodiment.

FIG. 6 shows an example of signaling according to the present embodiment. Step 601 is similar to step 401 of FIG. 4. Specifically, the first RAN node 1 receives slice support information indicating a network slice(s) supported by the second RAN node 2 from the second RAN node 2 via an XN SETUP REQUEST message or an XN SETUP RESPONSE message. the slice support information may include a list of one or more network slices.

Steps 602 and 603 concern a registration procedure initiated by a UE 4. The registration procedure of the 5GS is used, for example, for initial registration, periodic registration, and mobility registration. In step 602, the first RAN node 1 receives an RRC Setup Complete message from the UE 4. The RRC Setup Complete message includes AN parameters containing a Requested NSSAI and includes a NAS message (registration request message). The NAS message (registration request messages) also includes the Requested NSSAI.

The first RAN node 1 refers to the Requested NSSAI within the AN parameters received from the UE 4, and compares the S-NSSAIs included in the Requested NSSAI with the S-NSSAIs included in a list of network slices supported by the second RAN node 2. The first RAN node 1 then detects one or more S-NSSAIs that are included in the Requested NSSAI received from the UE 4 and are also supported by the second RAN node 2. In step 603, the first RAN node 1 sends an INITIAL UE MESSAGE message to the AMF 3. The INITIAL UE MESSAGE message includes the NAS message (registration request message) received from the UE 4. In addition, the INITIAL UE MESSAGE message includes a list of the one or more S-NSSAIs that are included in the Requested NSSAI received from the UE 4 and are also supported by the second RAN node 2.

FIG. 7 shows a specific example of the format of the INITIAL UE MESSAGE message sent in step 603. In the example of FIG. 7, the INITIAL UE MESSAGE message includes a Requested S-NSSAI List for Secondary RAT. The Requested S-NSSAI List for Secondary RAT includes a list of one or more S-NSSAIs that are included in the Requested NSSAI received from the UE 4 and are also supported by Secondary RAT (i.e., the second RAN node (potential SN) 2).

FIG. 8 shows another example of the format of the INITIAL UE MESSAGE message sent in step 603. In the example of FIG. 8, the INITIAL UE MESSAGE message includes a Requested S-NSSAI List. The Requested S-NSSAI List indicates the S-NSSAIs included in Requested NSSAI received from the UE 4, and indicates whether each S-NSSAI is supported by Secondary RAT (i.e., the second RAN node (potential SN) 2) or not (Secondary RAT Support).

The procedure of FIG. 6 enables the first RAN node 1 to send the slice support information indicating a network slice(s) supported by the second RAN node 2 to the AMF 3 via a UE-associated signaling message. In one example, the AMF 3 may determine a network slice(s) allowed for the UE, taking into account the list received in step 503. More specifically, the AMF 3 may incorporate, into an Allowed NSSAI of the UE 4, one or more S-NSSAIs that are included in the Requested NSSAI received from the UE 4 and are supported by the second RAN node 2 (if these also match the Subscribed S-NSSAIs of the UE 4).

Figure 9:
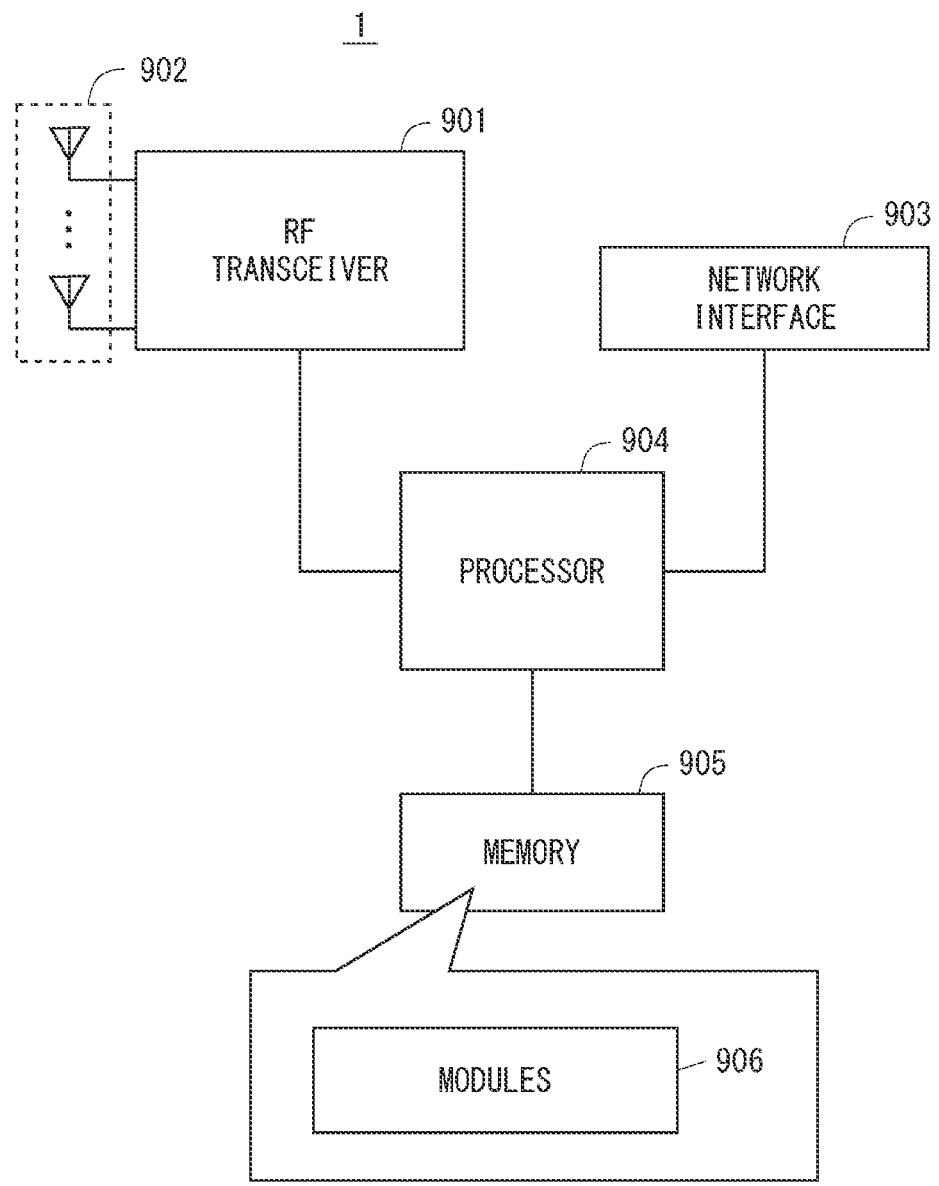
FIG. 9 is a block diagram showing a configuration example of a RAN node according to an embodiment.

The following provides configuration examples of the RAN node 1, the RAN node 2, and the AMF 3 according to the above-described embodiments. FIG. 9 is a block diagram showing a configuration example of the RAN node 1 according to the above-described embodiments. The RAN node 2 may have a configuration similar to that shown in FIG. 9. Referring to FIG. 9, the RAN node 1 includes a Radio Frequency (RF) transceiver 901, a network interface 903, a processor 904, and a memory 905. The RF transceiver 901 performs analog RF signal processing to communicate with UEs. The RF transceiver 901 may include a plurality of transceivers. The RF transceiver 901 is coupled to an antenna array 902 and the processor 904. The RF transceiver 901 receives modulated symbol data from the processor 904, generates a transmission RF signal, and supplies the transmission RF signal to the antenna array 902. Further, the RF transceiver 901 generates a baseband reception signal based on a reception RF signal received by the antenna array 902 and supplies the baseband reception signal to the processor 904. The RF transceiver 901 may include an analog beamformer circuit for beam forming. The analog beamformer circuit includes, for example, a plurality of phase shifters and a plurality of power amplifiers.

The network interface 903 is used to communicate with network nodes (e.g., other RAN nodes, AMF, and User Plane Function (UPF)). The network interface 903 may include, for example, a network interface card (NIC) conforming to the IEEE 802.3 series.

The processor 904 performs digital baseband signal processing (i.e., data-plane processing) and control-plane processing for radio communication. The processor 904 may include a plurality of processors. The processor 904 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing.

The digital baseband signal processing by the processor 904 may include, for example, signal processing of a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. The control-plane processing performed by the processor 904 may include processing of Non-Access Stratum (NAS) messages, RRC messages, MAC CEs, and DCIs.

The processor 904 may include a digital beamformer module for beam forming. The digital beamformer module may include a Multiple Input Multiple Output (MIMO) encoder and a pre-coder.

The memory 905 is composed of a combination of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 905 may include a storage located apart from the processor 904. In this case, the processor 904 may access the memory 905 via the network interface 903 or an I/O interface.

The memory 905 may store one or more software modules (computer programs) 906 including instructions and data to perform processing by the RAN node 1 described in the above embodiments. In some implementations, the processor 904 may be configured to load the software modules 906 from the memory 905 and execute the loaded software modules, thereby performing processing of the RAN node 1 described in the above embodiments.

When the RAN node 1 is a Central Unit (e.g., gNB-CU) in the C-RAN deployment, the RAN node 1 does not need to include the RF transceiver 901 (and the antenna array 902).

Figure 10:
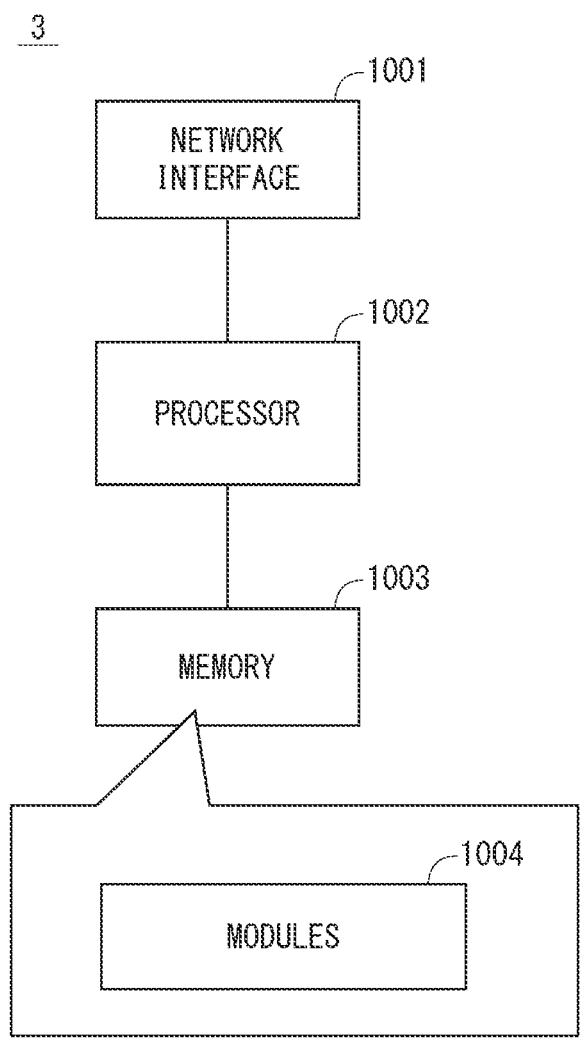
FIG. 10 is a block diagram showing a configuration example of an AMF according to an embodiment.

FIG. 10 is a block diagram showing a configuration example of the AMF 3. Referring to FIG. 10, the AMF 3 includes a network interface 1001, a processor 1002, and a memory 1003. The network interface 1001 is used to communicate, for example, with RAN nodes and with other network functions (NFs) or nodes in the 5GC. The other NFs or nodes in the 5GC include, for example, UDM, AUSF, SMF, and PCF. The network interface 1001 may include, for example, a network interface card (NIC) conforming to the IEEE 802.3 series.

The processor 1002 may be, for example, a microprocessor, a Micro Processing Unit (MPU), or a Central Processing Unit (CPU). The processor 1002 may include a plurality of processors.

The memory 1003 is composed of a volatile memory and a nonvolatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1003 may include a storage located apart from the processor 1002. In this case, the processor 1002 may access the memory 1003 via the network interface 1001 or an I/O interface.

The memory 1003 may store one or more software modules (computer programs) 1004 including instructions and data to perform the processing of the AMF 3 described in the above embodiments. In some implementations, the processor 1002 may be configured to load the one or more software modules 1004 from the memory 1003 and execute the loaded software modules, thereby performing the processing of the AMF 3 described in the above embodiments.

As described above with reference to FIGS. 9 and 10, each of the processors that the RAN node 1, the RAN node 2, and the AMF 3 according to the above embodiments include executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

Other Embodiments

Each of the above embodiments may be used individually, or whole or a part of the embodiments may be appropriately combined with one another.

The operations of the RAN node 1 and the AMF 3 described in the above embodiments is especially effective when the second RAN node (potential SN) 2 is responsible for only an SN for DC in the non-standalone deployment and has no RAN-CN CP interface with any AMF. That is, these operations can allow the UE to utilize a network slice that are only supported by SNs in the non-standalone deployments. However, these embodiments may be applied to deployment in which the second RAN node (potential SN) 2 has a RAN-CN CP interface with the AMF 3.

In the above-described embodiments, the first RAN node (potential MN) 1 may further notify the AMF 3 of cell information regarding a cell served by the second RAN node (potential SN) 2. More specifically, the first RAN node (potential MN) 1 may send the cell information to the AMF 3 in an NG Setup procedure or RAN Configuration Update procedure. In regard to the cell served by the second RAN node 2, the cell information may include one or any combination of: (a) a cell identifier (e.g., NR Physical Cell ID (PCI)); (b) Tracking Area Code (TAC); and (c) frequency band (e.g., NR Absolute Radio Frequency Channel Number (NR-ARFCN)).

In the above-described embodiments, the AMF 3 may forward the slice support information received from the first RAN node (potential MN) 1 to an SMF. The SMF may perform session management for the UE 4 in consideration of (or according to) the slice support information.

The name of the AMF 3 in the above-described embodiments is not limited to "AMF". In other words, the AMF 3 in the above-described embodiments may be an apparatus (e.g., another core network node) having functions similar to those of AMF.

The above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

Supplementary Note 1

A radio access network (RAN) node apparatus comprising:
  at least one memory; and
  at least one processor coupled to the at least one memory and configured to:
    send, to an Access and Mobility management Function (AMF) in a core network, slice support information indicating a network slice supported by another RAN node that can be used as a secondary node in dual connectivity in which the RAN node apparatus acts as a master node.

Supplementary Note 2

RAN node apparatus according to Supplementary Note 1, wherein the al least one processor is configured to send the slice support information to the AMF via a non-User Equipment (UE)-associated signaling message.

Supplementary Note 3

RAN node apparatus according to Supplementary Note 1 or 2, wherein the al least one processor is configured to send the slice support information to the AMF in a procedure for setting up or updating application-level configuration data required for the RAN node apparatus and the AMF to interwork with each other on a control-plane interface.

Supplementary Note 4

RAN node apparatus according to Supplementary Note 3, wherein
  the control-plane interface is an NG-C interface, and
  the procedure for setting up or updating is an NG Setup procedure or a RAN Configuration Update procedure.

Supplementary Note 5

RAN node apparatus according to Supplementary Note 1, wherein the al least one processor is configured to, in response to receiving from a User Equipment (UE) an Access Stratum (AS) message containing a Non-Access Stratum (NAS) message, send the slice support information to the AMF via a signaling message for forwarding the NAS message to the AMF.

Supplementary Note 6

RAN node apparatus according to any one of Supplementary Notes 1 to 5, wherein the at least one processor is configured to receive a message indicating the network slice from the other RAN node.

Supplementary Note 7

RAN node apparatus according to any one of Supplementary Notes 1 to 6, wherein the slice support information indicates a network slice identifier of the network slice supported by the other RAN node.

Supplementary Note 8

RAN node apparatus according to any one of Supplementary Notes 1 to 7, wherein the slice support information includes a list of supported network slice identifiers per Tracking Area (TA) supported by the other RAN node.

Supplementary Note 9

An Access and Mobility management Function (AMF) apparatus comprising:
  at least one memory; and
  at least one processor coupled to the at least one memory and configured to:
    receive, from a first radio access network (RAN) node, slice support information indicating a network slice supported by a second RAN node that can be used as a secondary node in dual connectivity in which the first RAN node acts as a master node.

Supplementary Note 10

AMF apparatus according to Supplementary Note 9, wherein the at least one processor is configured to, in response to receiving a Non-Access Stratum (NAS) message from a User Equipment (UE) via the first RAN node, determine one or more network slices allowed for the UE, taking into account the network slice supported by the second RAN node.

Supplementary Note 11

AMF apparatus according to Supplementary Note 9 or 10, wherein the at least one processor is configured to receive the slice support information via a non-User Equipment (UE)-associated signaling message.

Supplementary Note 12

AMF apparatus according to any one of Supplementary Notes 9 to 11, wherein the at least one processor is configured to receive the slice support information in a procedure for setting up or updating application-level configuration data required for the first RAN node and the AMF to interwork with each other on a control-plane interface.

Supplementary Note 13

AMF apparatus according to any Supplementary Note 12, wherein
  the control-plane interface is an NG-C interface, and the procedure for setting up or updating is an NG Setup procedure or a RAN Configuration Update procedure.

Supplementary Note 14

AMF apparatus according to Supplementary Note 9 or 10, wherein the at least one processor is configured to receive the slice support information via a signaling message for forwarding a Non-Access Stratum (NAS) message generated by a User Equipment (UE) from the first RAN node to the AMF apparatus.

Supplementary Note 15

AMF apparatus according to any one of Supplementary Notes 9 to 14, wherein the slice support information indicates a network slice identifier of the network slice supported by the second RAN node.

Supplementary Note 16

AMF apparatus according to any one of Supplementary Notes 9 to 15, wherein the slice support information includes a list of supported network slice identifiers per Tracking Area (TA) supported by the second RAN node.

Supplementary Note 17

A method performed by a radio access network (RAN) node apparatus, the method comprising:
sending, to an Access and Mobility management Function (AMF) in a core network, slice support information indicating a network slice supported by another RAN node that can be used as a secondary node in dual connectivity in which the RAN node apparatus acts as a master node.

Supplementary Note 18

A method performed by an Access and Mobility management Function (AMF) apparatus, the method comprising:
receiving, from a first radio access network (RAN) node, slice support information indicating a network slice supported by a second RAN node that can be used as a secondary node in dual connectivity in which the first RAN node acts as a master node.

Supplementary Note 19

A program for causing a computer to perform a method for a radio access network (RAN) node apparatus, the method comprising:
sending, to an Access and Mobility management Function (AMF) in a core network, slice support information indicating a network slice supported by another RAN node that can be used as a secondary node in dual connectivity in which the RAN node apparatus acts as a master node.

Supplementary Note 20

A program for causing a computer to perform a method for an Access and Mobility management Function (AMF) apparatus, the method comprising:
receiving, from a first radio access network (RAN) node, slice support information indicating a network slice supported by a second RAN node that can be used as a secondary node in dual connectivity in which the first RAN node acts as a master node.

This application is based upon and claims the benefit of priority from Japanese Patent Application No. 2020-067094, filed on Apr. 2, 2020, the disclosure of which is incorporated herein in its entirety by reference.

REFERENCE SIGNS LIST

1 RAN node
2 RAN node
3 AMF
905 Memory
906 Modules
1003 Memory
1004 Modules

The invention claimed is:
1. A radio access network (RAN) node apparatus comprising:
at least one memory; and
at least one processor coupled to the at least one memory and configured to:
in response to receiving from a User Equipment (UE) a message containing one or more network slice identifiers and detecting that at least one network slice identifier of the one or more network slice identifiers is supported by another RAN node that can be used as a secondary node in dual connectivity in which the RAN node apparatus acts as a master node, send, to an Access and Mobility management Function (AMF) in a core network, slice support information indicating that at least one network slice identified by the at least one network slice identifier is supported by the another RAN node.
2. The RAN node apparatus according to claim 1, wherein the al least one processor is configured to send the slice support information to the AMF via a non-UE-associated signaling message.
3. The RAN node apparatus according to claim 1, wherein the al least one processor is configured to send the slice support information to the AMF in a procedure for setting up or updating application-level configuration data required for the RAN node apparatus and the AMF to interwork with each other on a control-plane interface.
4. The RAN node apparatus according to claim 3, wherein the control-plane interface is an NG-C interface, and
the procedure for setting up or updating is an NG Setup procedure or a RAN Configuration Update procedure.
5. The RAN node apparatus according to claim 1, wherein the message is an Access Stratum (AS) message containing a Non-Access Stratum (NAS) message, and the al least one processor is configured to send the slice support information to the AMF via a signaling message for forwarding the NAS message to the AMF.
6. The RAN node apparatus according to claim 1, wherein the at least one processor is configured to receive a message indicating one or more network slices supported by the another RAN node from the another RAN node.
7. The RAN node apparatus according to claim 1, wherein the slice support information indicates the at least one network slice identifier of the at least one network slice supported by the another RAN node.
8. The RAN node apparatus according to claim 1, wherein the slice support information includes a list of supported network slice identifiers per Tracking Area (TA) supported by the another RAN node.

9. A method performed by a radio access network (RAN) node apparatus, the method comprising:
in response to receiving from a User Equipment (UE) a message containing one or more network slice identifiers and detecting that at least one network slice identifier of the one or more network slice identifiers is supported by another RAN node that can be used as a secondary node in dual connectivity in which the RAN node apparatus acts as a master node, sending, to an Access and Mobility management Function (AMF) in a core network, slice support information indicating that at least one a network slice identified by the at least one network slice identifier is supported by the another RAN node.

\* \* \* \* \*